US008599194B2

(12) United States Patent
Lewis et al.

(10) Patent No.: US 8,599,194 B2
(45) Date of Patent: Dec. 3, 2013

(54) SYSTEM AND METHOD FOR THE INTERACTIVE DISPLAY OF DATA IN A MOTION CAPTURE ENVIRONMENT

(75) Inventors: George Steven Lewis, Alvarado, TX (US); John Valentino, Hurst, TX (US); Christopher Michael Bothwell, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 279 days.

(21) Appl. No.: 12/522,641

(22) PCT Filed: Jan. 22, 2008

(86) PCT No.: PCT/US2008/051661
§ 371 (c)(1),
(2), (4) Date: Jul. 9, 2009

(87) PCT Pub. No.: WO2008/091869
PCT Pub. Date: Jul. 31, 2008

(65) Prior Publication Data
US 2010/0053152 A1    Mar. 4, 2010

Related U.S. Application Data

(60) Provisional application No. 60/886,059, filed on Jan. 22, 2007.

(51) Int. Cl.
*G06T 15/00*    (2011.01)
*G09G 5/00*    (2006.01)

(52) U.S. Cl.
USPC ............ 345/419; 345/619; 345/653; 345/661

(58) Field of Classification Search
None
See application file for complete search history.

(56) References Cited

U.S. PATENT DOCUMENTS

| 5,999,185 | A | 12/1999 | Kato et al. | |
|---|---|---|---|---|
| 6,308,565 | B1 | 10/2001 | French | |
| 6,538,655 | B1 * | 3/2003 | Kubota | 345/474 |
| 6,624,853 | B1 | 9/2003 | Latypov | |
| 6,681,629 | B2 | 1/2004 | Foxlin et al. | |
| 6,798,407 | B1 | 9/2004 | Benman | |
| 7,084,884 | B1 * | 8/2006 | Nelson et al. | 345/619 |
| 7,372,463 | B2 * | 5/2008 | Anand | 345/473 |
| 7,468,778 | B2 * | 12/2008 | Thomas et al. | 352/85 |

(Continued)

FOREIGN PATENT DOCUMENTS

| GB | 2385238 A | 8/2003 |
|---|---|---|
| WO | 0221451 A1 | 3/2002 |

OTHER PUBLICATIONS

International Preliminary Examination Report in PCT Application PCT/US08/51651, dated Jul. 6, 2009, 7 pages.

(Continued)

*Primary Examiner* — Kee M Tung
*Assistant Examiner* — Leon T Cain, II
(74) *Attorney, Agent, or Firm* — James E. Walton; J. Oliver Williams (57) ABSTRACT

A system includes an analysis system for performing an analysis and a motion capture environment interfaced with the analysis system. The motion capture system includes at least one sensor-tracker for tracking a location of a tracked object within the motion capture environment and one or more computers collectively operable to generate a virtual reality environment corresponding to the analysis.

17 Claims, 4 Drawing Sheets

(56) References Cited

U.S. PATENT DOCUMENTS

| | | | |
|---|---|---|---|
| 7,885,732 B2* | 2/2011 | Troy et al. ............... | 701/2 |
| 7,937,253 B2* | 5/2011 | Anast et al. ............. | 703/6 |
| 7,952,594 B2 | 5/2011 | Morita et al. | |
| 8,018,579 B1 | 9/2011 | Krah | |
| 8,073,479 B2 | 12/2011 | Valliath et al. | |
| 8,241,118 B2 | 8/2012 | Cambi | |
| 2002/0010571 A1 | 1/2002 | Daniel | |
| 2002/0010734 A1 | 1/2002 | Ebersole et al. | |
| 2004/0080507 A1 | 4/2004 | Von Prittwitz | |
| 2004/0104935 A1 | 6/2004 | Williamson et al. | |
| 2004/0113885 A1 | 6/2004 | Genc et al. | |
| 2005/0143172 A1 | 6/2005 | Kurzweil | |
| 2005/0166163 A1* | 7/2005 | Chang et al. ............. | 715/863 |
| 2005/0233865 A1 | 10/2005 | Reiffel | |
| 2006/0001650 A1* | 1/2006 | Robbins et al. ........... | 345/173 |
| 2006/0087509 A1 | 4/2006 | Ebert et al. | |
| 2006/0192852 A1 | 8/2006 | Rosenthal et al. | |
| 2006/0228101 A1 | 10/2006 | Sullivan et al. | |
| 2006/0267932 A1 | 11/2006 | Rosenberg et al. | |
| 2006/0290695 A1 | 12/2006 | Salomie et al. | |
| 2007/0003915 A1 | 1/2007 | Templeman | |
| 2011/0320567 A1 | 12/2011 | Edecker et al. | |

OTHER PUBLICATIONS

International Search Report and Written Opinion in PCT Application PCT/US08/51642, dated Jun. 27, 2008, 7 pages.
International Preliminary Report on Patentability in PCT Application PCT/US08/51642, dated Dec. 29, 2008, 7 pages.
International Search Report and Written Opinion in Parent PCT Application PCT/US08/51661, dated Jul. 1, 2008, 6 pages
International Preliminary Report on Patentability in Parent PCT Application PCT/US08/51661, dated Dec. 29, 2008, 7 pages.
SpotON: An Indoor 3D Location Sensing Technology Based on RF Signal Strength, by Hightower et al., University of Washington Computer Science and Engineering Technical Report #2000-02-02, Feb. 18, 2000, 16 pages.
Office Action in U.S. Appl. No. 12/595,373, dated Feb. 17, 2012, 8 pages.
International Search Report and Written Opinion in PCT Application PCT/US08/60562, dated Aug. 15, 2008, 7 pages.
International Preliminary Report on Patentability in PCT Application PCT/US08/60562, dated Feb. 18, 2010, 7 pages.
Office Action in U.S. Appl. No. 12/522,620, dated Oct. 31, 2011, 9 pages.
Supplementary European Search Report in European Application No. 08713892, dated Sep. 29, 2010, 5 pages.
International Search Report and Written Opinion in PCT Application PCT/US08/51651, dated Jun. 27, 2008, 6 pages.
First Examination Report from the Canadian Intellectual Property Office in related Canadian application No. 2,675,999, mailed Jul. 5, 2012, 2 pages.
Office action from U.S. Appl. No. 12/595,373 dated Aug. 15, 2012.
Office Action from U.S. Appl. No. 12/522,620 dated Oct. 9, 2012.
Office Action from U.S. Appl. No. 12/522,620 dated Apr. 12, 2012.
Advisory action from U.S. Appl. No. 12/595,373 dated Nov. 2, 2012.
Office Action from U.S. Appl. No. 12/522,568 dated Aug. 2, 2012.
First Examination Report from the Canadian Patent Office in related Canadian application 2,675,995, mailed May 2, 2013, 4 pages.
First Examination Report from the Canadian Patent Office in related Canadian application 2,684,487, mailed Apr. 24, 2013, 3 pages.
Extended European Search Report in related European patent application No. 08733207.8, mailed Jul. 2, 2013, 5 pages.
Extended European Search Report in related European patent application No. 08713901.0, mailed Jun. 28, 2013, 6 pages.
"Surround-Screen Projection-based Virtual Reality: The Design and Implementation of the CAVE", Carolina Cruz-Neira, Computer Graphics: Annual Conference Series, New York, NY No. 20th, Aug. 1, 1993, pp. 135-142, XP002660833.

* cited by examiner

SYSTEM AND METHOD FOR THE INTERACTIVE DISPLAY OF DATA IN A MOTION CAPTURE ENVIRONMENT

TECHNICAL FIELD

The present invention relates to virtual reality environments.

DESCRIPTION OF THE PRIOR ART

Many systems and methodologies exist that analyze how matter reacts when the matter is subjected to certain conditions. For example, computational fluid dynamics is one of the branches of fluid mechanics that uses numerical methods and algorithms to solve and analyze problems that involve fluid flows. Computers are used to perform the millions of calculations required to simulate the interaction of fluids and gases with complex surfaces used in engineering. Other such systems and methodologies include computational stress analysis, finite element analysis, and the like.

One particular shortcoming of such computational methodologies and systems is in the visualization of the output data provided from these systems. Often, the output data exists in three dimensions. For example, output data from a computational fluid dynamics system may include three-dimensional location data, pressure data, temperature data, and the like. Conventional analysis systems, however, provide visualization of the data in fewer dimensions than the data represents. For example, conventional visualization techniques provide a "picture" of the data in two physical dimensions on a monitor, along with color coding corresponding to levels of other conditions, such as temperature and pressure.

There are ways of controlling virtual reality environments well known in the art; however, considerable shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
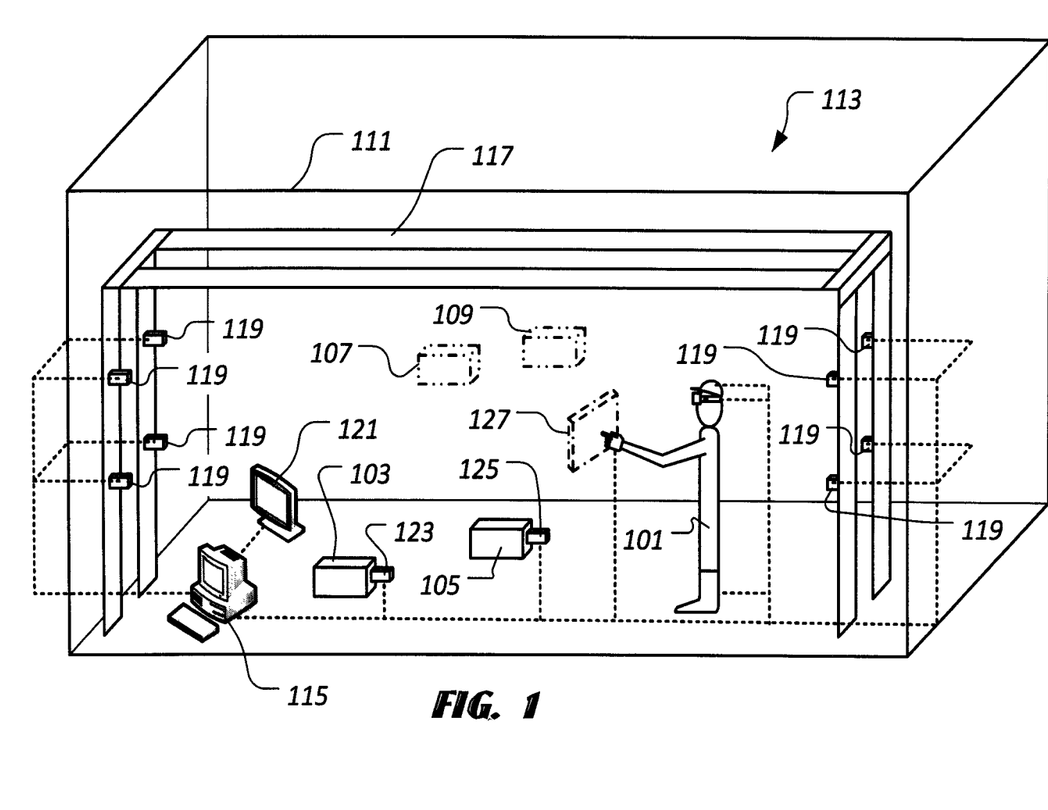
FIG. 1 is a stylized, exemplary, perspective view of an actor within a studio of a motion capture environment.

Referring to FIG. 1, in a virtual reality environment or virtual reality scene, one or more users or actors 101 interact with one or more physical objects 103 and/or 105 in a physical or real environment and/or one or more virtual artifacts 107 and/or 109 in the virtual reality environment. The one or more actors 101 are physically present in a three-dimensional space, known as a studio 111 in which the one or more actors 101 may move the one or more physical objects 103 and/or 105. A motion capture environment 113 is contained by studio 111. Motion capture environment 113 includes one or more computers 115 and software resident on the one or more computers 115 that are operable to generate virtual reality scenes. Motion capture environment 113 further includes a framework 117, upon which to mount tracker-sensors 119 and/or tracker-sensor combinations, which are described in greater detail herein. The software includes one or more computer programs that interpret information from the tracker-sensors and one or more computer programs that create the virtual reality scenes or environment.

A virtual representation of studio 111 exists in motion capture environment 113, which hosts the virtual reality environment. The one or more actors 101 use display devices, for example, headset viewers, such as a headset viewer 201 of FIG. 2; monitors, such as a monitor 121; or the like, to view the virtual reality environment. The virtual reality environment is the scene that the one or more actors 101, or other such observers, see via the display devices. The virtual reality environment may be a virtual representation of the studio or the virtual reality environment may be a virtual representation of any other real or imagined three-dimensional space. Moreover, the virtual reality environment may be a combination of a virtual representation of the studio and a virtual representation of another real or imagined three-dimensional space.

Figure 2:
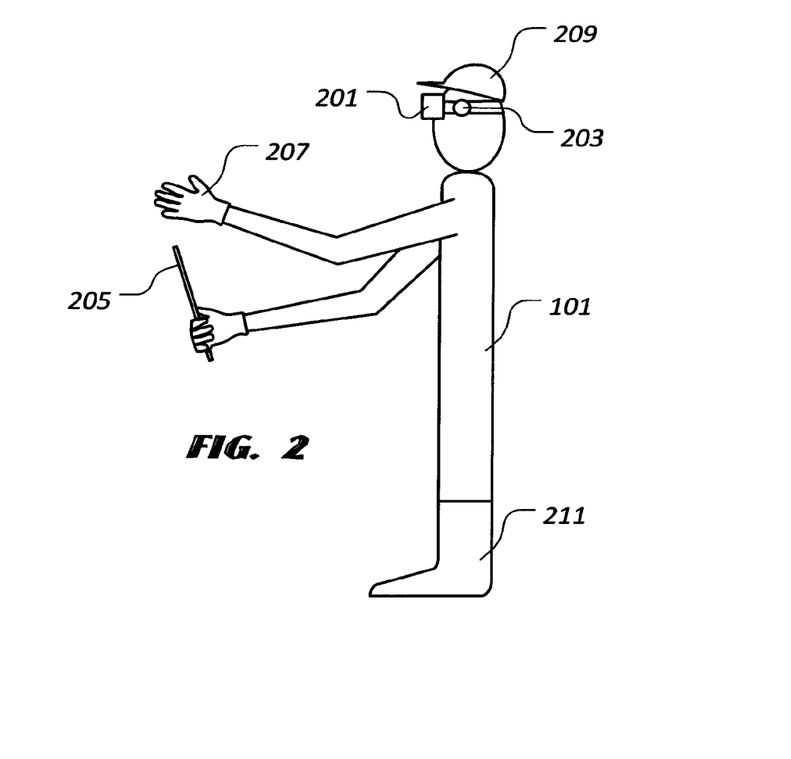
FIG. 2 is an enlarged view of the actor of FIG. 1.

Physical objects, such as physical objects 103 and 105, that are disposed within studio 111 and that are moved by the one or more actors 101, are tracked using motion capture environment 113. These "tracked objects" may be tracked by a variety of sensor methodologies, including, but not limited to, reflectors, such as reflectors 123 and 125 and reflector 203 of FIG. 2; inertial measurement units; and the like. Examples of such inertial measurement units include, but are not limited to, ring laser gyroscopes, accelerometers, ultrasonic emitter-receptors, and the like. Referring to FIG. 2, examples of tracked objects include, but are not limited to, wands, such as a wand 205; gloves, such as a glove 207; hats, such as a hat 209; head mounted displays, such as headset viewer 201; boots, such as boot 211; and the like.

Tracker-sensors, such as tracker sensors 119, interface with motion capture environment 113 and determine where a tracked object, such as physical objects 103 and 105, is located within the physical space of the studio. Such tracker-sensors may comprise a single unit or a plurality of units. The tracker-sensors may be attached to a framework, such as framework 117, which defines the physical limits of the studio or may be attached to the tracked objects, or both. While tracker-sensors may utilize various methodologies for tracking tracked objects, certain tracker-sensors use inertial acceleration with subsequent integration to provide rate and displacement information, ultrasonic measurement, optical measurement, near infrared measurement, as well as methods that use other bands of radiation within the electromagnetic spectrum.

Figure 3:
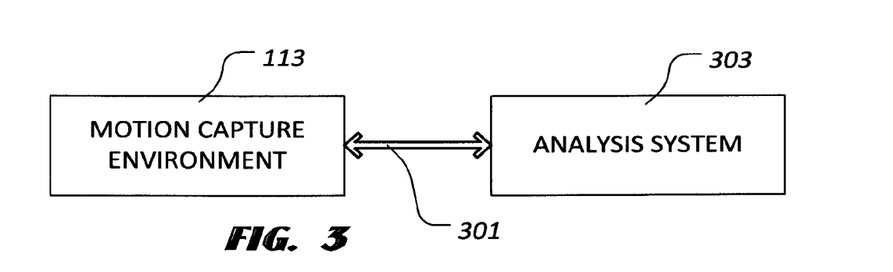
FIG. 3 is a stylized, block diagram of the motion capture system of FIG. 1 interfaced with an exemplary analysis system.

As shown in FIG. 3, motion capture environment 113 has an interface 301 to an analysis system 303. Examples of such analysis systems include, but are not limited to, a computational fluid dynamics system, a computational stress analysis system, a finite element analysis system, and the like. There are innumerable types of analysis systems 303 that may be interfaced with motion capture environment 113. Motion capture environment 113 generates a virtual reality environment or scene that includes data from analysis system 303, so that the actor, such as actor 101, may interact with the virtual representation of the analysis data. Note that the analysis data may be represented in many dimensions, such as three physical dimensions, e.g., height, length, depth; color; sound; and the like.

While interacting with the virtual representation of the analysis data, actor 101 wears a tracking costume, comprising, for example, headset viewer 201, one or more wands 205, one or more gloves 207, hat 209, one or more boots 211, each shown in FIG. 2, or the like. Wands 205, gloves 207, hat 209, boots 211, and the like are tracked by the tracker-sensors. The process or device to be observed is generated by analysis system 303 and the resulting geometry is sent from the analysis program to the virtual reality scene, created by motion capture environment 113, via interface 301. Actor 101 can observe the object and can touch the object in a virtual sense. Actor 101 can reorient himself or herself relative to the object, the object can be resized for detailed inspection of a portion of the object or for an overall impression. In one embodiment, these actions are accomplished via a virtual control panel 127, shown in FIGS. 1 and 7, which is discussed in greater detail herein. Alternatively, or in conjunction with virtual control panel 127, the actions may be accomplished by actual virtual manipulation of the object by actor 101. In some cases, a virtual object may be modified in real time by actor 101 and the results shown immediately.

Figure 4:
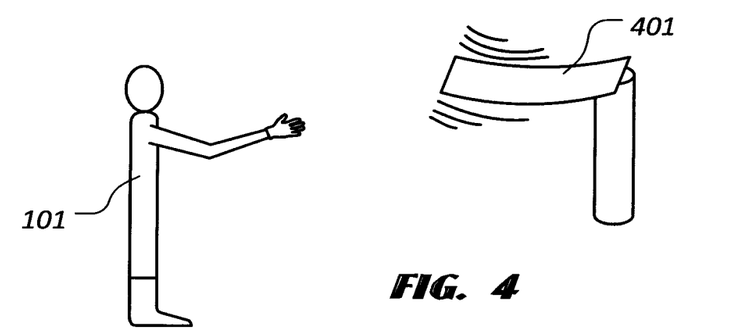
FIG. 4 is stylized view of an actor viewing a representation of data in a virtual reality environment.

There are innumerable implementations of the interactive display of data in motion capture environment 113. One exemplary implementation is the visualization of a flexible beam that has unacceptably high vibration displacement when exposed to a particular vibratory force. Referring now to FIG. 4, an actor, such as actor 101, within a virtual reality environment observes a virtual beam 401 being subjected to certain conditions within a modal analysis system, which is one type of analysis system 303 (shown in FIG. 3). The modal analysis system determines the response of virtual beam 401 to the applied conditions and sends the resulting geometrical output to the virtual reality scene. Motion of virtual beam 401 is depicted in the virtual reality environment in time and space.

Figure 5:
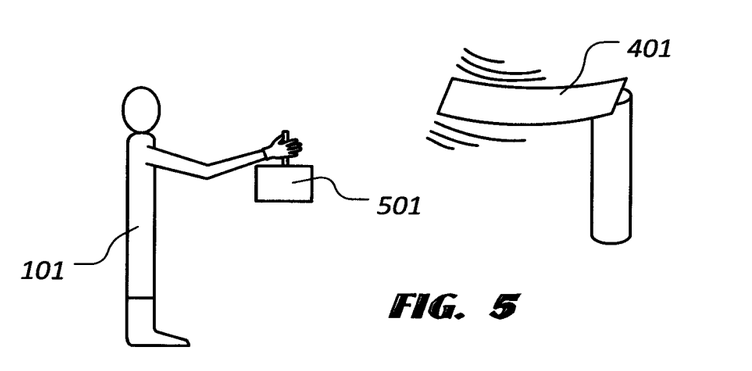
FIG. 5 is a stylized view of the actor of FIG. 3 viewing a representation of data being modified by the actor in the virtual reality environment.
Figure 6:
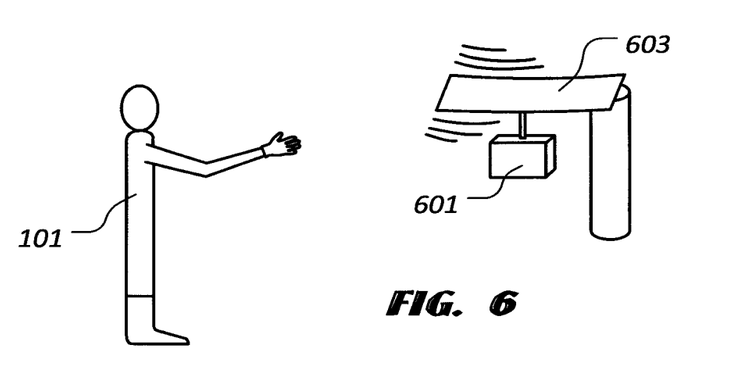
FIG. 6 is a stylized view of the actor of FIG. 3 viewing a representation of data after the data has been modified by the actor.

As depicted in FIG. 5, actor 101, if he or she so desires, may attempt to modify virtual beam 401 by calling up a virtual toolbox, such as a virtual toolbox 501, that contains, for example, virtual tuning weights. Actor 101 may select one of the virtual tuning weights and place it on virtual beam 401. Actor 101 may request a new modal analysis. Preferably, the results of the new analysis display immediately, as if actor 101 had actually, physically placed a real, physical weight 601 on a real vibrating beam 603, as shown in FIG. 6. If the weight is insufficient or placed incorrectly, actor 101 can continue to iterate the mass and placement of the weight until the vibration levels are acceptable.

Figure 7:
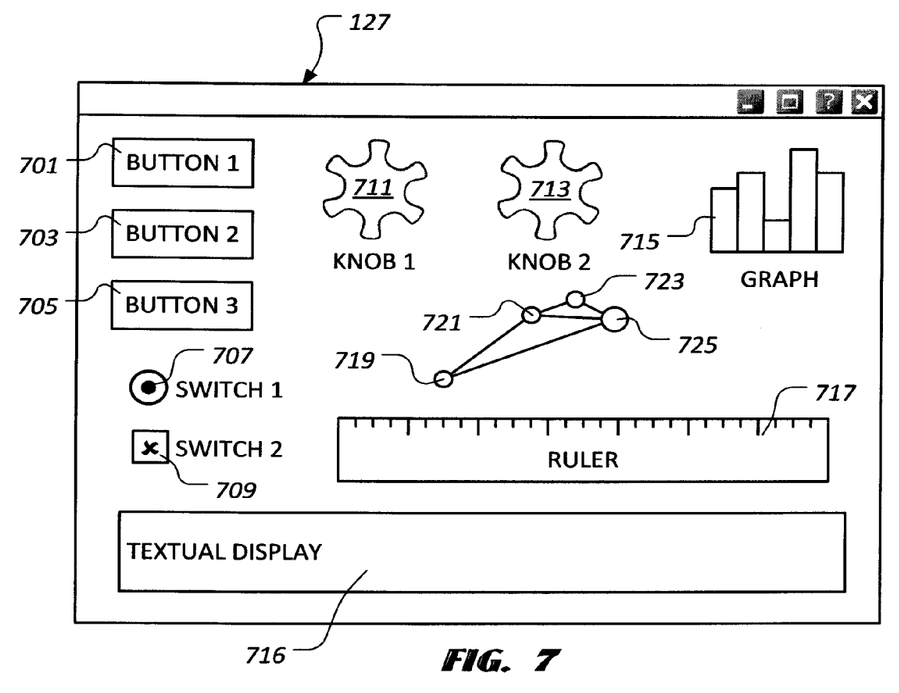
FIG. 7 is a stylized, exemplary view of representation of a virtual control panel within the virtual reality environment for use by the actor.

Referring now to FIGS. 1 and 7, a virtual control panel, such as the displayed representation of virtual control panel 127, also known as a synthetic remote control, exists as a virtual artifact only in the virtual reality environment and is produced by motion capture environment 113. Virtual control panel 127 is a virtual object displayed by the display device, such as headset viewer 201 of FIG. 2, used by actor 101 to see the virtual reality environment. Virtual control panel 127 may also be displayed on other display devices, such as monitor 121 of FIG. 1, that can be viewed by those that are not actors. In one embodiment, virtual control panel 127 is a virtual means for inputting information to motion capture environment 113 by actor 101. For example, as shown in FIG. 7, virtual control panel 127 comprises a plurality of controls that may be manipulated by actor 101. In the embodiment illustrated in FIG. 7, the controls include, but are not limited to, for example, buttons 701, 703, and 705; switches 707 and 709; and knobs 711 and 713, which may be manipulated by actor 101. It should be noted that virtual control panel 127 may include additional or alternative controls that may be manipulated by actor 101.

Moreover, virtual control panel 127 may include one or more means for providing information from motion capture environment 113 to actor 101. For example, virtual control panel 127 may provide information relating to a simulation being performed to actor 101, such as a color scale or graph 715 representing certain parameter levels or a textual display 716 providing other such information. Moreover, virtual control panel 127 may comprise other tools which can be utilized by actor 101 in the virtual reality environment. For example, virtual control panel 127 may provide a virtual ruler 717, which can be used by actor 101 to measure virtual artifacts, distances between virtual artifacts, or the like.

It should be noted that the virtual control panel is able to "float" in virtual space at a location specified by actor 101 and may be moved from one place in the virtual environment to another place in the virtual environment by actor 101. The controls may be manipulated by actor 101's virtual hand, defined by a glove, such as glove 207, best shown in FIG. 2.

Representations or "markers" 719, 721, 723, and 725, corresponding to a reflector from a glove worn by actor 101, are also illustrated in FIG. 7. The manipulation of the control is detected by interpreting the motion of the actor's virtual hand when the actor's virtual hand is in "touching" proximity to the control, as determined by motion capture environment 113. Motion capture environment 113 determines how the control has been manipulated and reacts to the manipulation appropriately.

In one embodiment, actor 101 in studio 111 manipulates a virtual hand in the virtual reality environment by wearing and physically moving glove 207, best shown in FIG. 2, which is a tracked object. Motion capture environment 113 interprets the motion of the glove and determines where actor 101's virtual hand is located in the virtual reality environment and how the virtual hand is oriented. In this embodiment, actor 101 wears headset viewer 201, best shown in FIG. 2, that is equipped with a synthetic vision viewer. The synthetic vision viewer displays to actor 101 the virtual reality environment and the location of the virtual hand within the virtual reality environment. Thus, actor 101 can see the virtual hand in the context of the scene of the virtual reality environment.

In FIGS. 1 and 2, actor 101 is wearing headset viewer 201 and glove 207. Actor 101 is reaching into empty physical space to press a button, such as one of buttons 701, 703, or 705, of virtual control panel 127.

Virtual control panel is preferably positioned at some starting location within the virtual reality environment or may be opened and displayed at any convenient location within the virtual reality environment when actor 101 issues a command "summoning" virtual control panel 127. Tracker-sensors 119 track the location of glove 207, best shown in FIG. 2, and, thus, the virtual hand in the virtual reality environment and compare the location of the virtual hand in the virtual reality environment to the locations of the virtual control panel's controls in the virtual reality environment. When a collision is detected between the virtual hand and a virtual control of virtual control panel 127, the virtual hand is deemed to be touching the control. Motion capture environment 113 responds to the motion of the virtual hand and a mapping of a control state to a desired action causes the desired action to occur, just as if a physical or real hand had manipulated a physical or real control. Actor 101 can operate a virtual control of virtual control panel 127 in the same way actor 101 can physically operate a tangible, physical object or control capable of being physically touched and physically manipulated. It should be noted that touching buttons, knobs, switches, and the like of the virtual control panel is but one way of interacting with the virtual control panel.

Moreover, virtual control panel 127 can grow and shrink in size and capability without limit. Furthermore, virtual control panel 127 can be made to disappear or reappear at the will of actor 101, without interfering with the scene in the virtual reality environment. Virtual control panel 127 is able to float at any location and orientation desired by actor 101.

The interactive display of data in motion capture environment 113 provides many advantages to a virtual reality experience. For example, the display of data in three-dimensional space is more intuitive and allows the user to see phenomena that may be hidden in two-dimensional representations of three-dimensional data. Moreover, the display of three-dimensional data in three-dimensional space makes observing all surfaces of the object easier. Surfaces that may be difficult or impossible to see in a real world setting are more easily inspected in a virtual environment. Furthermore, virtual objects are infinitely re-orientable and scalable by the actor in the virtual environment, so that experts are more closely integrated with the analysis. Virtual scenes incorporating analysis data provide the potential to link analytic solutions to displays for interactive virtual experimentation.

It should be noted that motion capture environment 113 comprises one or more computers, such as computer 115, executing software embodied in a computer-readable medium that is operable to produce and control the virtual reality environment. The scope of the invention encompasses, among other things, motion capture environment, such as motion capture environment 113 of FIG. 1; the software operable to produce and control the virtual reality environment; and the method for producing and controlling the virtual reality environment, carried out by motion capture environment 113.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A system, comprising:
an analysis system for performing an analysis and generating an analysis data associated with the analysis; and
a motion capture environment interfaced with the analysis system, the motion capture system comprising:
   at least one sensor-tracker for tracking a location of a tracked object within the motion capture environment; and
   one or more computers collectively operable to generate a virtual reality environment, the virtual reality environment being generated by a studio, the studio being a three-dimensional space for containing the motion capture environment, an actor, and the tracked object, the one or more computers being further collectively operable to display the virtual reality environment to the actor that is physically present in the studio;
wherein the one or more computers are further collectively operable to generate and display the analysis data associated with the analysis to the actor so that the actor can interact with a virtual representation of the analysis data in the virtual reality environment;
wherein the analysis system interacts with the one or more computers through an interface to provide a virtual representation of the analysis data to be observed, the analysis system is configured to permit virtual modification of the analysis data in real time to achieve an interactive virtual experimentation;
wherein the actor interacts with the analysis system to determine conditions of the analysis;
wherein the tracked object is related to the actor and the one or more computers are further collectively operable to allow the actor to modify an element being analyzed by the analysis system; and
wherein modification of the element by the actor is accomplished by placing a virtual tuning weight on the element being analyzed, the virtual tuning weight being selected by the actor from among a plurality of virtual tuning weights in a virtual toolbox.

2. The system, according to claim 1, wherein the analysis system includes a computational fluid dynamics system.

3. The system, according to claim 1, wherein the analysis system includes a computational stress analysis system.

4. The system, according to claim 1, wherein the analysis system includes a finite element analysis system.

5. The system, according to claim 1, wherein the one or more computers are further collectively operable to:
generate a virtual reality environment including a virtual control panel having a virtual control that, when actuated, effects a predetermined result in the virtual reality environment;
determine a virtual location of the tracked object within the virtual reality environment; and
determine when the virtual location of the tracked object coincides with the location of the virtual control to actuate the virtual control.

6. A method for interactively displaying data in a motion capture environment, the method comprising:
performing an analysis through an analysis system configured to communicate through an interface with one or more computers, the analysis system generating an analysis data associated with the analysis;
generating a virtual reality environment including the analysis data associated the analysis, the virtual reality environment being generated by a studio, the studio being a three-dimensional space for containing the motion capture environment, an actor, and the tracked object, the one or more computers being further collectively operable to display the virtual reality environment to the actor that is physically present in the studio; and
displaying the virtual reality environment to an actor participating in the virtual reality environment; and
experimenting with the analysis data to determine solutions;
wherein the one or more computers are operable to generate and display the analysis data associated with the analysis to the actor so that the actor can interact with a virtual representation of the analysis data in the virtual reality environment;
wherein the analysis system is configured to permit virtual modification of the analysis data in real time to achieve real time solutions through an interactive virtual experimentation;
wherein the analysis system is configured to permit modification of the analysis system by the actor;
wherein experimenting with the analysis data includes:
modifying an element in the virtual reality environment analyzed by the analysis system; and
performing an analysis through the analysis system for the modified element; and
wherein modifying the element includes placing a virtual tuning weight on the element being analyzed, the virtual tuning weight being selected by the actor from among a plurality of virtual tuning weights in a virtual toolbox.

7. The method, according to claim 6, wherein performing the analysis includes performing a computational fluid dynamics analysis.

8. The method, according to claim 6, wherein performing the analysis includes performing a computational stress analysis.

9. The method, according to claim 6, wherein performing the analysis includes performing a finite element analysis.

10. The method, according to claim 6, further comprising:
generating a virtual control panel within the virtual reality environment, the virtual control panel including a virtual control that, when actuated, effects a predetermined result in the virtual reality environment;
determining a virtual location of a tracked object within the virtual reality environment that is associated with the actor; and
determining when the virtual location of the tracked object coincides with the location of the virtual control to actuate the virtual control.

11. The method, according to claim 10, further comprising:
providing information relating to the analysis to the actor via the virtual control panel.

12. Software for interactively displaying analysis data in a motion capture environment, the software embodied in a computer-readable medium and when executed operable to:
perform an analysis through an analysis system in communication with one or more computers and generate the analysis data associated with the analysis;
generate a virtual reality environment including results of the analysis;
display the virtual reality environment to an actor participating in the virtual reality environment; the virtual reality environment being generated by a studio, the studio being a three-dimensional space for containing the motion capture environment, an actor, and the tracked object, the one or more computers being further collectively operable to display the virtual reality environment to the actor that is physically present in the studio;
generate and display the analysis data associated with the analysis to the actor so that the actor can interact with a virtual representation of the analysis data in the virtual reality environment and the actor can adjust conditions the analysis is based upon;
wherein the analysis system is configured to permit virtual modification of the analysis data in real time to achieve real time solutions through an interactive virtual experimentation;
the software being further operable to:
modify an element in the virtual reality environment analyzed by the analysis; and
perform an analysis for the modified element;
wherein modifying the element includes placing a virtual tuning weight on the element being analyzed, the virtual tuning weight being selected by the actor from among a plurality of virtual tuning weights in a virtual toolbox; and
wherein the computer-readable medium is non-transitory.

13. The software, according to claim 12, wherein the analysis includes a computational fluid dynamics analysis.

14. The software, according to claim 12, wherein the analysis includes a computational stress analysis.

15. The software, according to claim 12, wherein the analysis includes a finite element analysis.

16. The software, according to claim 12, further operable to:
generate a virtual control panel within the virtual reality environment, the virtual control panel including a virtual control that, when actuated, effects a predetermined result in the virtual reality environment;
determine a virtual location of a tracked object within the virtual reality environment that is associated with the actor; and
determine when the virtual location of the tracked object coincides with the location of the virtual control to actuate the virtual control.

17. The software, according to claim 16, further operable to:
provide information relating to the analysis to the actor via the virtual control panel.

* * * * *